United States Patent [19]

Oltrogge

[11] 4,430,195

[45] Feb. 7, 1984

[54] FLUID BED RETORTING PROCESS WITH LATERAL FLOW

[75] Inventor: Robert D. Oltrogge, Wheaton, Ill.

[73] Assignees: Standard Oil Company, (Indiana), Chicago, Ill.; Gulf Oil Corporation

[21] Appl. No.: 333,040

[22] Filed: Dec. 21, 1981

[51] Int. Cl.³ .................. C10B 49/00; C10B 53/00; C10G 1/00

[52] U.S. Cl. .................. 208/8 R; 208/11 R; 201/31

[58] Field of Search ............ 208/11 R, 8 R; 201/31, 201/34

[56] References Cited

U.S. PATENT DOCUMENTS

| | | | |
|---|---|---|---|
| 2,560,767 | 3/1946 | Huff | 208/11 R X |
| 2,618,588 | 11/1952 | Jahnis | 201/31 X |
| 2,623,815 | 12/1952 | Roetheli et al. | 201/31 X |
| 2,626,234 | 1/1953 | Barr et al. | 208/11 R X |
| 3,020,227 | 2/1962 | Nevens et al. | 208/11 R |
| 4,133,741 | 1/1979 | Weichman et al. | 208/11 R |
| 4,199,432 | 4/1980 | Tamm et al. | 208/11 R X |
| 4,293,401 | 10/1981 | Sieg et al. | 208/11 R |
| 4,332,669 | 6/1982 | Spars et al. | 208/11 R |

Primary Examiner—Delbert E. Gantz
Assistant Examiner—Glenn A. Caldarola
Attorney, Agent, or Firm—Thomas W. Tolpin; William T. McClain; William H. Magidson

[57] ABSTRACT

A fluid bed retorting process is provided in which solid heat carrier material and solid hydrocarbon-containing material, such as oil shale, tar sand and coal, are fluidly moved in a lateral direction until they spill over an upright barrier into an overflow discharge outlet. The solids can be premixed in the retort before entering the laterally moving fluid bed in a premixing fluidizing chamber or with a conical deflector. Upright annular or transverse baffles can be positioned in the fluid bed to minimize lateral backmixing of solids and can also extend above the surface of the fluid bed to minimize wave propagation. Any unfluidized coarse particles can also be moved laterally by gravity flow and jet deflectors.

22 Claims, 8 Drawing Figures

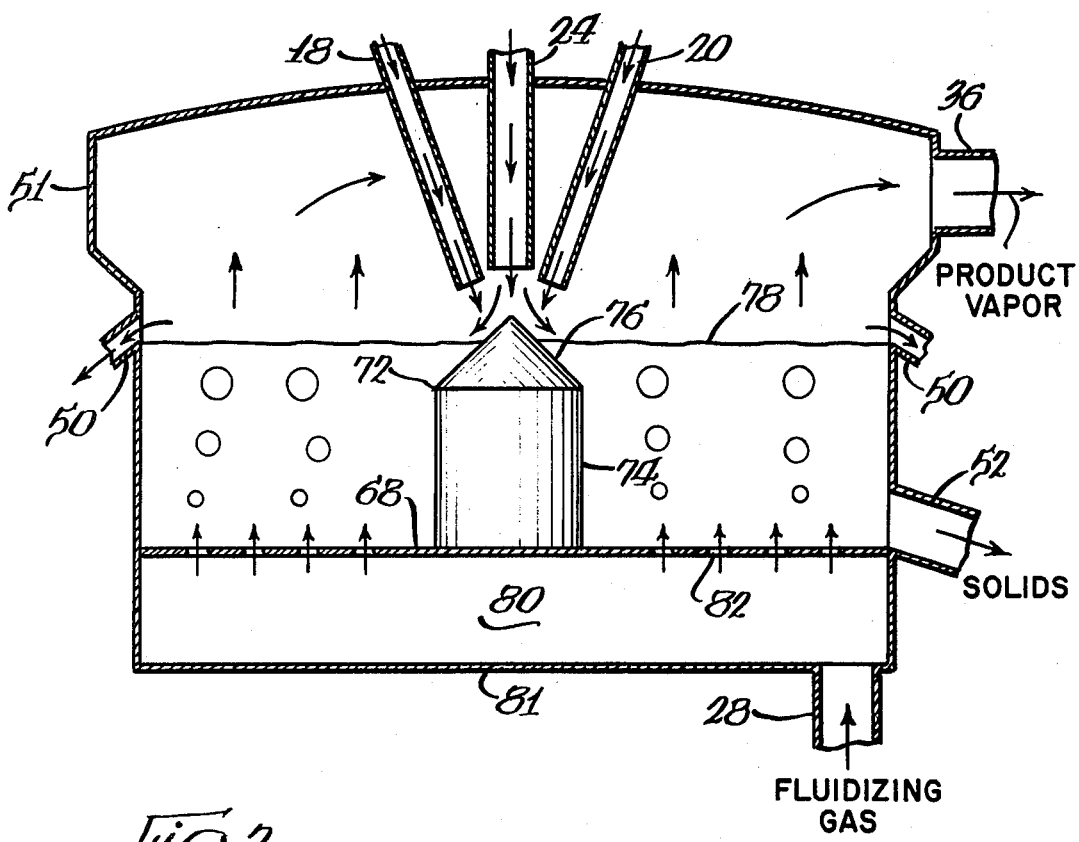
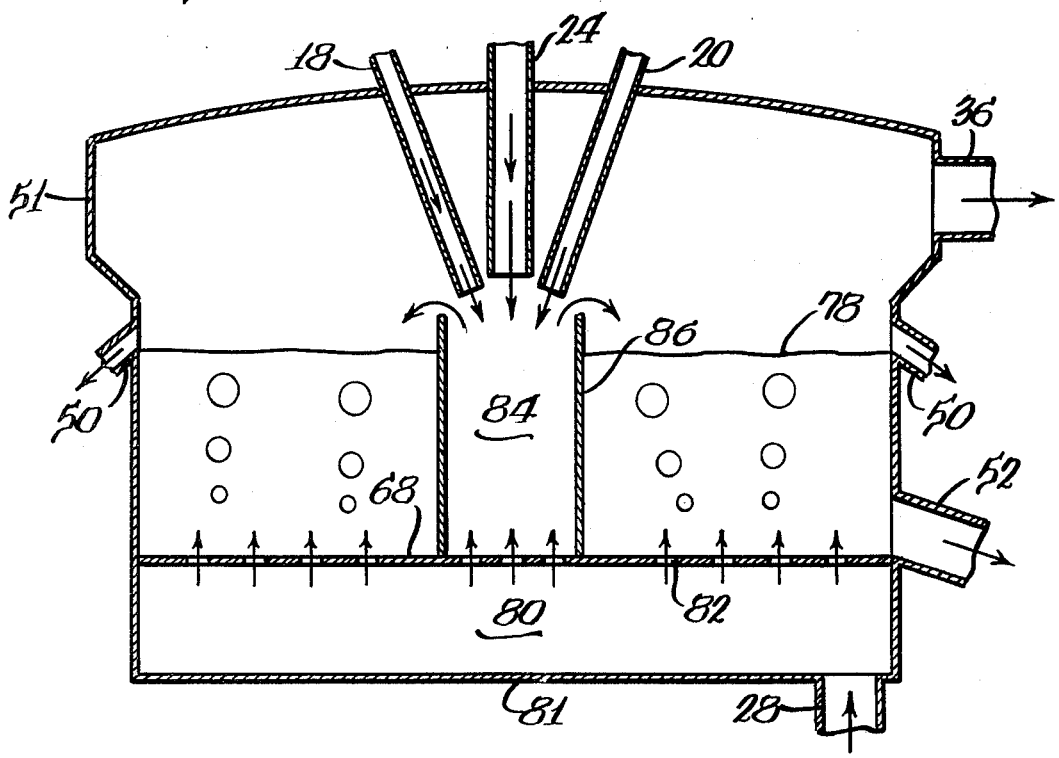

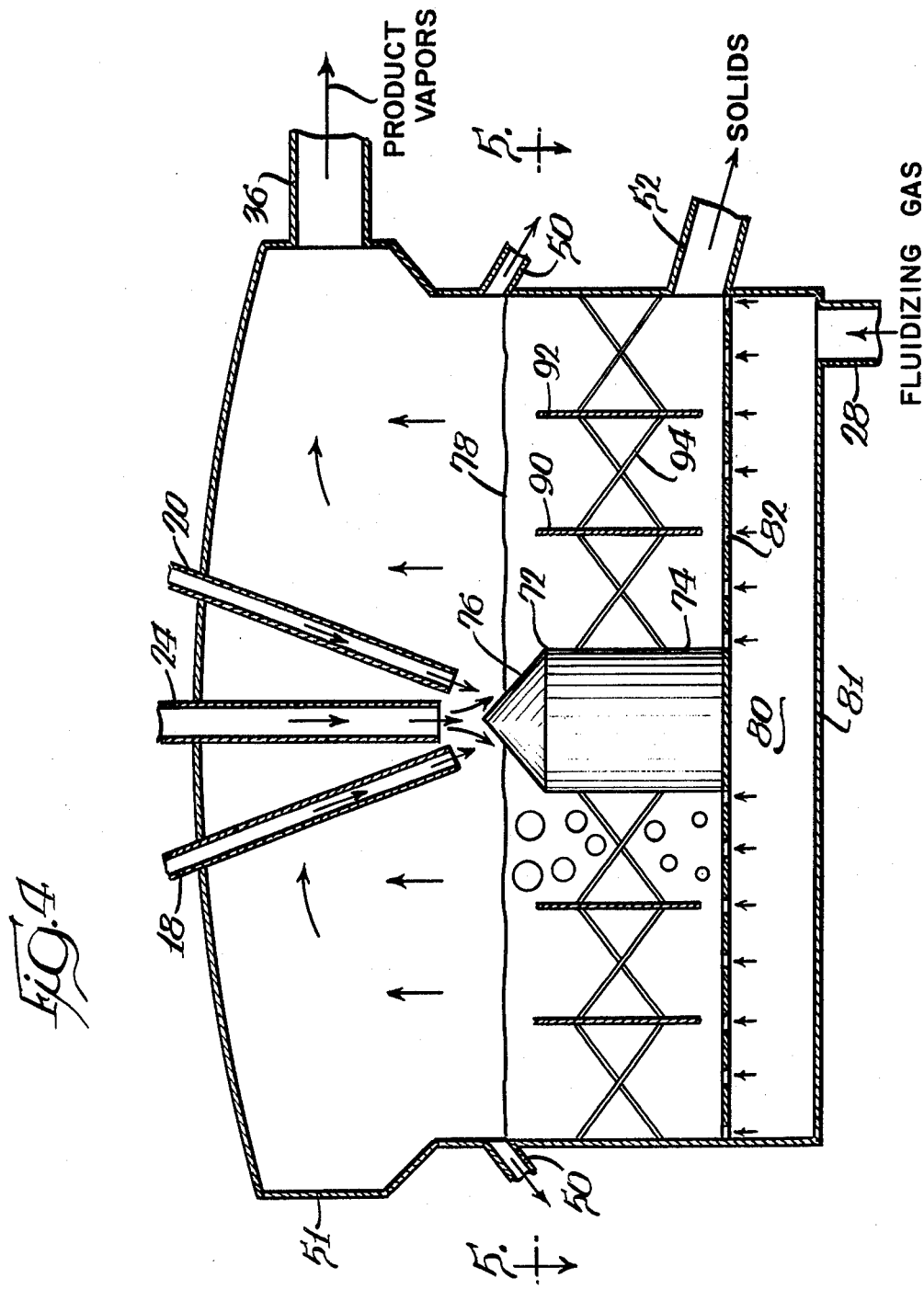

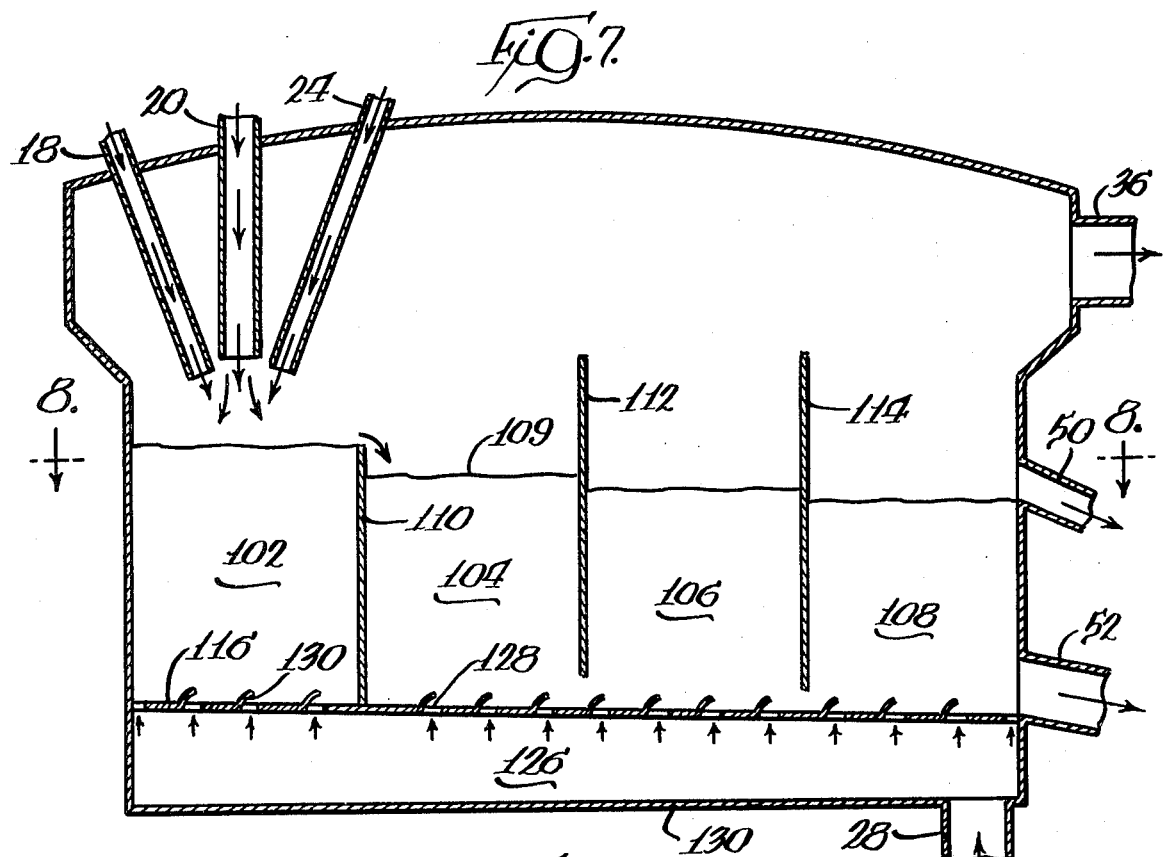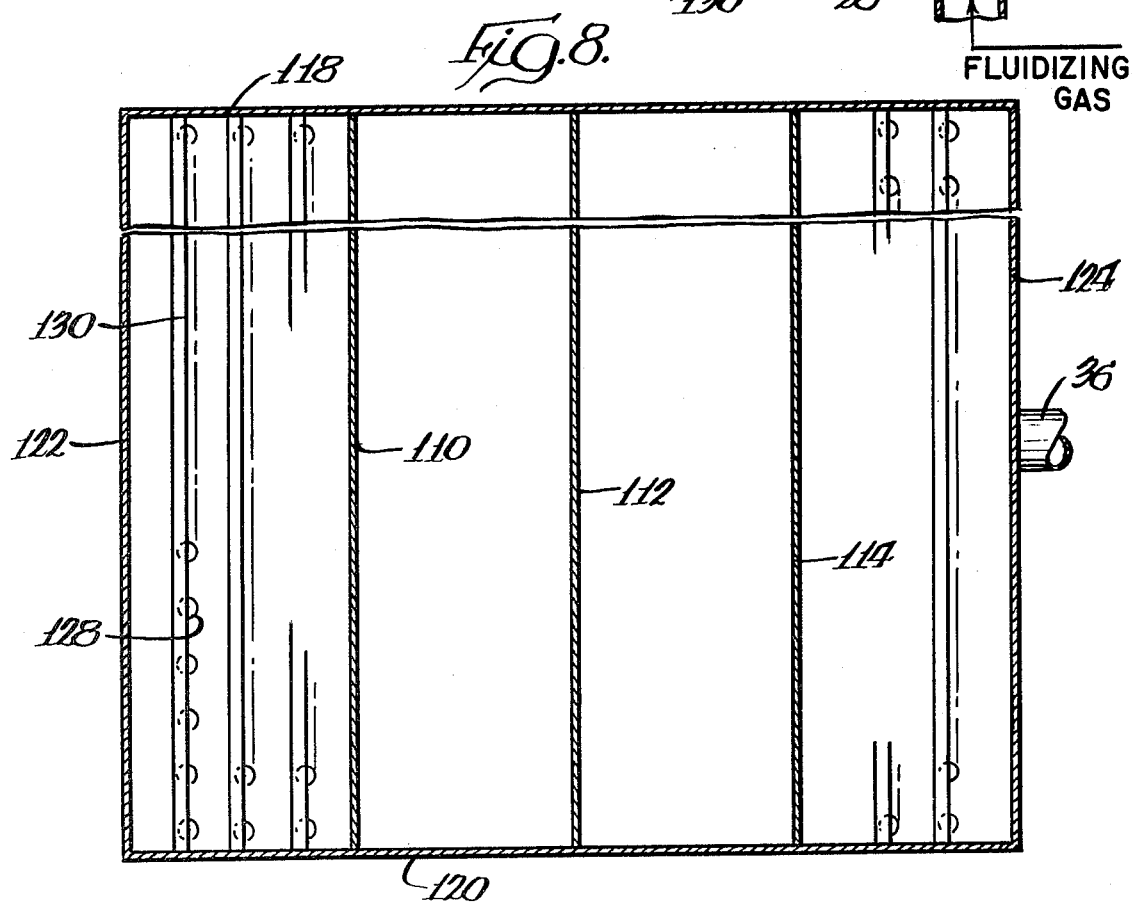

FLUID BED RETORTING PROCESS WITH LATERAL FLOW

BACKGROUND OF THE INVENTION

This invention relates to a process and system for retorting hydrocarbon-containing material, and more particularly, to a fluid bed process and system for retorting solid, hydrocarbon-containing material such as oil shale, coal and tar sand.

Researchers have now renewed their efforts to find alternate sources of energy and hydrocarbons in view of recent rapid increases in the price of crude oil and natural gas. Much research has been focused on recovering hydrocarbons from solid hydrocarbon-containing material such as oil shale, coal and tar sand by pyrolysis or upon gasification to convert the solid hydrocarbon-containing material into more readily usable gaseous and liquid hydrocarbons.

Vast natural deposits of oil shale found in the United States and elsewhere contain appreciable quantities of organic matter known as "kerogen" which decomposes upon pyrolysis or distillation to yield oil, gases and residual carbon. It has been estimated that an equivalent of 7 trillion barrels of oil are contained in oil shale deposits in the United States with almost sixty percent located in the rich Green River oil shale deposits of Colorado, Utah, and Wyoming. The remainder is contained in the leaner Devonian-Mississippian black shale deposits which underlie most of the eastern part of the United States.

As a result of dwindling supplies of petroleum and natural gas, extensive efforts have been directed to develop retorting processes which will economically produce shale oil on a commercial basis from these vast resources.

Generally, oil shale is a fine-grained sedimentary rock stratified in horizontal layers with a variable richness of kerogen content. Kerogen has limited solubility in ordinary solvents and therefore cannot be recovered by extraction. Upon heating oil shale to a sufficient temperature, the kerogen is thermally decomposed to liberate vapors, mist, and liquid droplets of shale oil and light hydrocarbon gases such as methane, ethane, ethene, propane and propene, as well as other products such as hydrogen, nitrogen, carbon dioxide, carbon monoxide, ammonia, steam and hydrogen sulfide. A carbon residue typically remains on the retorted shale.

Shale oil is not a naturally occurring product, but is formed by the pyrolysis of kerogen in the oil shale. Crude shale oil, sometimes referred to as "retort oil," is the liquid oil product recovered from the liberated effluent of an oil shale retort. Synthetic crude oil (syncrude) is the upgraded oil product resulting from the hydrogenation of crude shale oil.

The process of pyrolyzing the kerogen in oil shale, known as retorting, to form liberated hydrocarbons, can be done in surface retorts in aboveground vessels or in situ retorts underground. In principle, the retorting of shale and other hydrocarbon-containing materials, such as coal and tar sand, comprises heating the solid hydrocarbon-containing material to an elevated temperature and recovering the vapors and liberated effluent. However, as medium grade oil shale yields approximately 20 to 25 gallons of oil per ton of shale, the expense of materials handling is critical to the economic feasibility of a commercial operation.

In order to obtain high thermal efficiency in retorting, carbonate decomposition should be minimized. Colorado Mahogany zone oil shale contains several carbonate minerals which decompose at or near the usual temperature attained when retorting oil shale. Typically, a 28 gallon per ton oil shale will contain about 23% dolomite (a calcium/magnesium carbonate) and about 16% calcite (calcium carbonate), or about 780 pounds of mixed carbonate minerals per ton. Dolomite requires about 500 BTU per pound and calcite about 700 BTU per pound for decomposition, a requirement that would consume about 8% of the combustible matter of the shale if these minerals were allowed to decompose during retorting. Saline sodium carbonate minerals also occur in the Green River formation in certain areas and at certain stratigraphic zone. The choice of a particular retorting method must therefore take into consideration carbonate decomposition as well as raw and spent materials handling expense, product yield and process requirements.

In surface retorting, oil shale is mined from the ground, brought to the surface, crushed and placed in vessels where it is contacted with a hot heat transfer carrier, such as hot spent shale, sand or gases, or mixtures thereof, for heat transfer. The resulting high temperatures cause shale oil to be liberated from the oil shale leaving a retorted, inorganic material and carbonaceous material such as coke. The carbonaceous material can be burned by contact with oxygen at oxidation temperatures to recover heat and to form a spent oil shale relatively free of carbon. Spent oil shale which has been depleted in carbonaceous material is removed from the retort and recycled as heat carrier material or discarded. The liberated hydrocarbons and combustion gases are dedusted in cyclones, electrostatic precipitators, filters, scrubbers or pebble beds.

Some well-known processes of surface retorting are: N-T-U (Dundas Howes retort), Kiviter (Russian), Petrosix (Brazilian), Lurgi-Ruhrgas (German), Tosco II, Galoter (Russian), Paraho, Koppers-Totzek, Fushum (Manchuria), Union rock pump, gas combustion and fluid bed. Process heat requirements for surface retorting processes may be supplied either directly or indirectly.

Directed heated surface retorting processes, such as the N-T-U, Kiviter, Fusham and gas combustion processes, rely upon the combustion of fuel, such as recycled gas or residual carbon in the spent shale, with air or oxygen within the bed of shale in the retort to provide sufficient heat for retorting. Directly heated surface retorting processes usually result in lower product yields due to unavoidable combustion of some of the products and dilution of the product stream with the products of combustion. The Fusham process is shown and described at pages 101–102, in the book *Oil Shales and Shale Oils*, by H. S. Bell, published by D. Van Norstrand Company (1948). The other processes are shown and described in the *Synthetic Fuels Data Handbook*, by Cameron Engineers, Inc. (second edition, 1978).

Indirectly heated surface retorting processes, such as the Petrosix, Lurgi-Ruhrgas, Tosco II and Galoter processes, utilize a separate furnace for heating solid or gaseous heat-carrying material which is injected, while hot, into the shale in the retort to provide sufficient heat for retorting. In the Lurgi-Ruhrgas process and some other indirect heating processes, raw oil shale or tar sand and a hot heat carrier, such as spent shale or sand, are mechanically mixed and retorted in a screw conveyor. Such mechanical mixing often results in high temperature zones conducive to undesirable thermal cracking as well as causing low temperature zones which result in incomplete retorting. Furthermore, in such processes, the solids gravitate to the lower portion of the vessel, stripping the retorted shale with gas causing lower product yields due to reabsorption of a portion of the evolved hydrocarbons by the retorted solids. Generally, indirect heating surface retorting processes result in higher yields and less dilution of the retorting product than directly heated surface retorting processes, but at the expense of additional materials handling.

Surface retorting processes with a moving bed are typified by the Lurgi coal gasification process in which crushed coal is fed into the top of a moving bed gasification zone and upflowing steam endothermically reacts with the coal. A portion of the char combusts with oxygen below the gasification reaction zone to supply the required endothermic heat of reaction. Moving bed processes can be disadvantageous because the solids residence time is usually long, necessitating either a very large contacting or reaction zone or a large number of reactors. Moreover, moving bed processes often cannot tolerate excessive amounts of fines.

Surface retorting processes with entrained beds are typified by the Koppers-Totzek coal process in which coal is dried, finely pulverized and injected into a treatment zone along with steam and oxygen. The coal is rapidly partially combusted, gasified, and entrained by the hot gases. Residence time of the coal in the reaction zone is only a few seconds. Entrained bed processes are disadvantageous because they require large quantities of hot gases to rapidly heat the solids and often require the raw feed material to be finely pulverized before processing.

Fluid bed surface retorting processes are particularly advantageous. The use of fluidized-bed contacting zones has long been known in the art and has been widely used in fluid catalytic cracking of hydrocarbons. When a fluid is passed at a sufficient velocity upwardly through a contacting zone containing a bed of subdivided solids, the bed expands and the particles are buoyed and supported by the drag forces caused by the fluid passing through the interstices among the particles. The superficial vertical velocity of the fluid in the contacting zone at which the fluid begins to support the solids is known as the "minimum fluidization velocity." The velocity of the fluid at which the solid becomes entrained in the fluid is known as the "terminal velocity" or "entrainment velocity." Between the minimum fluidization velocity and the terminal velocity, the bed of solids is in a fluidized state and it exhibits the appearance and some of the characteristics of a boiling liquid. Because of the quasi-fluid or liquid-like state of the solids, there is typically a rapid overall circulation of all the solids throughout the entire bed with substantially complete mixing, as in a stirred-tank reaction system. The rapid circulation is particularly advantageous in processes in which a uniform temperature and reaction mixture is desired throughout the contacting zone.

Typifying those prior art fluidized bed retorting processes, retorting processes with various types of baffles, deflectors or downcomers, fluid catalytic cracking processes, and similar processes are the Union Carbide/Battelle coal gasification process, the fluid coker and flexicoking processes described at page 300 of the *Synthetic Fuels Data Handbook*, by Cameron Engineers, Inc. (second edition, 1978) and those found in U.S. Pat. Nos. 1,546,659; 1,676,675; 1,690,935; 1,706,421; 2,471,119; 2,506,307; 2,518,693; 2,542,028; 2,582,711; 2,608,526; 2,626,234; 2,675,124; 2,700,644; 2,717,869; 2,726,196; 2,757,129; 2,788,314; 2,793,104; 2,813,823; 2,901,402; 3,083,471; 3,152,245; 3,297,562; 3,318,798; 3,501,394; 3,640,849; 3,663,421; 3,803,021; 3,803,022; 3,841,992; 3,976,558; 3,980,439; 4,035,152; 4,064,018; 4,087,347; 4,125,453; 4,133,739; 4,137,053; 4,141,794; 4,148,710; 4,152,245; 4,188,184; 4,193,760; 4,210,491; 4,243,489. These prior art processes have met with varying degrees of success.

Prior art gas fluidized bed processes usually have a dense particulate phase and a bubble phase, with bubbles forming at or near the bottom of the bed. These bubbles generally grow by coalescence as they rise through the bed. Mixing and mass transfer are enhanced when the bubbles are small and evenly distributed throughout the bed. When too many bubbles coalesce so that large bubbles are formed, a surging or pounding action results, leading to less efficient heat and mass transfer.

A problem with many prior art fluidized bed processes is the long residence time at high temperatures which results in many secondary and undesirable side reactions such as thermal cracking, which usually increases the production of less desirable gaseous products and decreases the yield and quality of desirable condensable products. Therefore, in any process designed to produce the maximum yield of high quality condensable hydrocarbons, it is preferred that the volatilized hydrocarbons are quickly removed from the retorting vessel in order to minimize deleterious side reactions such as thermal cracking.

Another problem with many prior art processes, particularly with countercurrent fluidized bed flow processes, is that after the shale oil has been vaporized, it then comes in contact with countercurrent flowing solids which are at a much cooler temperature, which leads to condensation of a portion of the shale oil and reabsorption of a portion of the vaporized shale oil into the downward flowing shale. This condensation and reabsorption leads to coking, cracking and polymerization reactions, all of which are detrimental to producing the maximum yield of condensable hydrocarbons.

A further problem with many prior art fluidized bed processes is that they often have low lateral mixing and high backmixing resulting in poor plug flow, slow retorting rates and excessive bed volumes. Moreover, many prior art fluidized bed processes require excessively high fluidizing velocities and pressures. Some prior art fluidizing processes even specify heat carrier material that is larger than the crushed raw oil shale particles.

It is therefore desirable to provide an improved fluid bed process which overcomes most, if not all, of the preceding problems.

SUMMARY OF THE INVENTION

An improved fluid bed retorting process with unique lateral overflow is provided to retort solid hydrocarbon-containing material, such as oil shale, coal and tar sand. In the novel process, solid hydrocarbon-containing material is mixed and heated with solid heat carrier material in a laterally moving fluid bed to liberate hydrocarbons from the solid hydrocarbon-containing material. The solid material in the bed is fluidly moved in a lateral direction, generally transverse or crosswise to an upwardly moving stream of fluidizing gas, until the solids spill over an upwardly extending fluid barrier into an overflow discharge outlet. In the process, the fluid bed moves laterally in response to the overflow and spilling of the fluidized solids.

In the preferred process, the solid heat carrier material is spent hydrocarbon-containing material for maximum thermal efficiency, although other solid heat carrier material can also be used, such as sand, ceramic balls or metal balls.

The fluidizing gas can be steam, light hydrocarbon gases that have been separated from the liberated hydrocarbons or off gases emitted during combustion of the retorted hydrocarbon-containing material in a combustor lift pipe. The fluidizing gas can also be preheated above the minimum retorting temperature of the solid hydrocarbon-containing material before entering the retort to provide supplementary het for retorting.

In one embodiment, separate streams of solid hydrocarbon-containing material and solid heat carrier material are poured into each other in the retort to mix the streams. The mixed streams can be directed against an apex of a conical baffle where they are deflected outwardly into the laterally moving fluid bed.

In another embodiment, the streams are fed downwardly into a fluidized premixing zone that is laterally surrounded by a generally imperforate, tubular containment wall within the interior of the retort. A fluidizing gas is injected upwardly into the premixing zone to fluidize, entrain and transport the solids generally upwardly over the top of the tubular containment wall into the laterally moving fluid bed.

In a further embodiment, the solids are fluidized, entrained and mixed with a fluidizing gas in a premixing fluidizing chamber of a trough-like, channel-shaped retort. In this embodiment, the fluidized solids flow over a transverse upright baffle or weir into the lateral moving fluid bed. The solids in the laterally moving fluid bed can be directed to flow below as well as above one or more upright annular or transverse baffles or weirs which divide the retort into a series of consecutive fluid bed chambers. The baffles and weirs can be imperforate or perforated and can extend above the top surface of the laterally moving fluid bed to minimize backmixing and wave propagation.

The floor of the retort can be inclined downwardly in the direction of flow to enhance gravity flow of larger, coarse solids. Jet deflectors can also be provided to enhance lateral flow of larger solids.

As used throughout this application, the terms "retorted" hydrocarbon-containing material, "retorted" solids, "retorted" particles or "retorted" shale refers to hydrocarbon-containing material, solids, particles or oil shale, respectively, which have been retorted to liberate hydrocarbons leaving a material containing carbon residue.

The terms "spent" hydrocarbon-containing material, "spent" solids, "spent" particles or "spent" shale as used herein means retorted hydrocarbon-containing material, solids, particles or shale, respectively, from which essentially all of the carbon residue has been removed by combustion.

The term "fluid bed" as used herein means a bed of solid hydrocarbon-containing material and heat carrier material which are fluidized by a gas.

The term "normally liquid" is relative to the condition of the subject material at a temperature of 77° F. (25° C.) and a pressure of one atmosphere.

A more detailed explanation of the invention is provided in the following description and appended claims taken in conjunction with the accompanying drawings.

BRIEF DESCRIPTION OF THE DRAWINGS

FIG. 2 is a cross-sectional view of a retort with a conical baffle for use in the process;

FIG. 3 is a cross-sectional view of a retort with a central premixing fluidizing zone peripherally surrounded by a tubular containment wall for use in the process;

FIG. 4 is a cross-section view of a retort with upright annular baffles for use in the process;

FIG. 7 is a cross-sectional view of a trough-like, channel-shaped retort for use in the process; and FIG. 8 is a cross-sectional view taken substantially along line 8—8 of FIG. 7.

DETAILED DESCRIPTION OF THE PREFERRED EMBODIMENT

Figure 1:
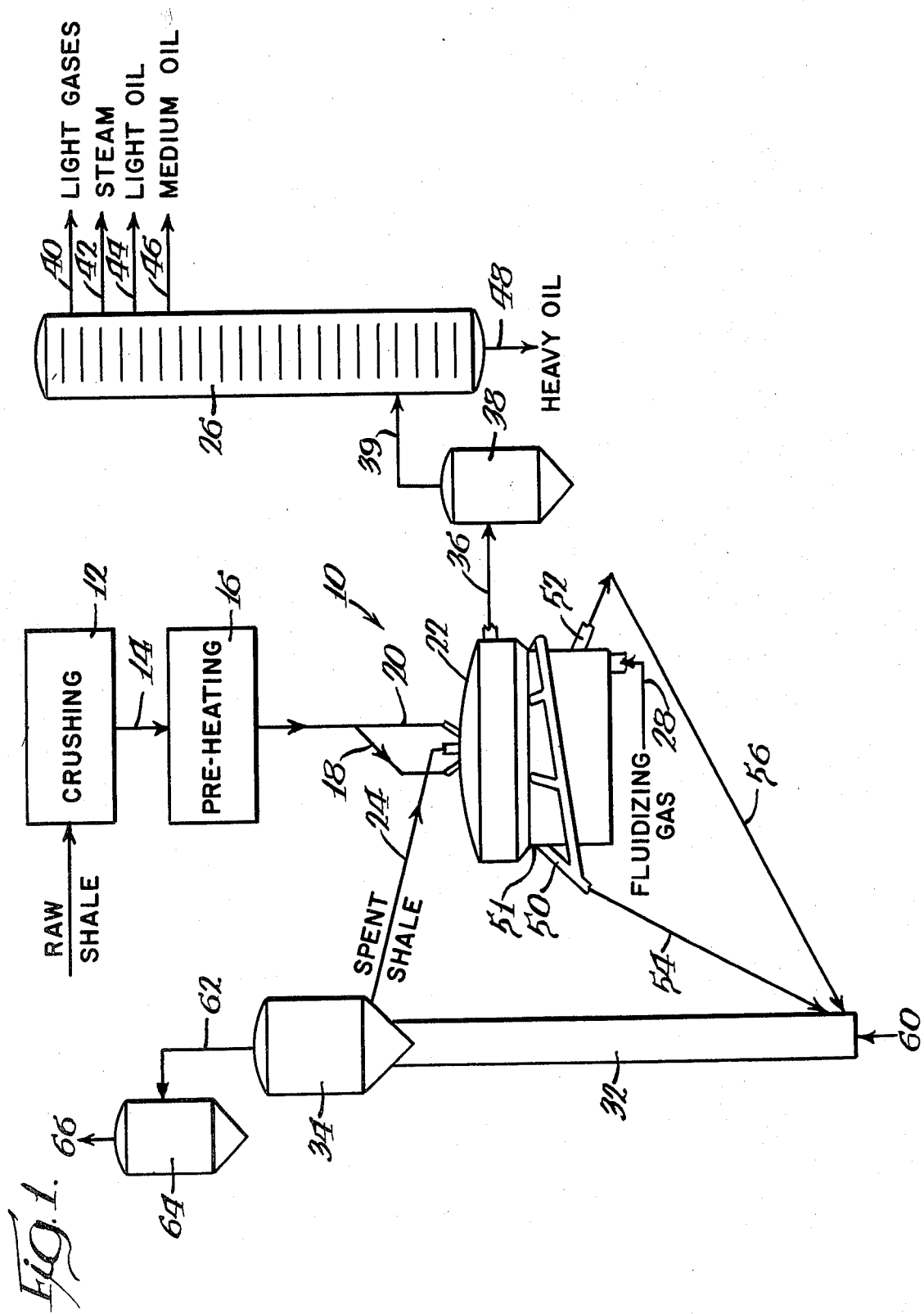
FIG. 1 is a schematic flow diagram of a retorting process in accordance with principles of the present invention.

Referring now to FIG. 1, a fluid bed process and system 10 is provided to retort hydrocarbon-containing material, such as oil shale, coal, tar sand, uintaite (gilsonite), lignite, peat and oil saturated diatomaceous earth (diatomite), for use in producing synthetic fuels. While the process of the present invention is described hereinafter with particular reference to the processing of oil shale, it will be apparent that the process can also be used to retort other hydrocarbon-containing materials such as coal, tar sand, uintaite, (gilsonite), lignite, peat, and oil saturated diatomaceous earth (diatomite) etc.

In process and system 10, raw oil shale is fed to a crushing and screening station 12. The oil shale should contain an oil yield of at least 15 gallons per ton of shale particles in order to make the process and system self-sustaining in terms of energy requirements, so that the lift gas can consist essentially of liberated light hydrocarbon gases, steam or combustion gases from the system and the heat carrier material can consist essentially of spent oil shale from the system.

At the crushing and screening station 12, raw oil shale is crushed, sized and sorted by conventional crushing equipment such as an impact crusher, jaw pressure, jaw crusher, gyratory crusher, or roll crusher and by conventional screening equipment such as a shaker screen or vibrating screen and discharged into feed line 14. Oil shale particles less than one micron should be discarded or processed elsewhere because fine particles of that size tend to clog up the retort and hinder retorting. Oil shale particles greater than 10 mm should be recrushed because such particles can adversely effect fluidizing and retorting of smaller, oil shale particles. Oil shale particles greater than 6 mm are not efficiently retorted in the retort without internals.

The crushed oil shale particles in feed line 14 is conveyed to a preheating station 16 where the shale is preheated to between ambient temperature and 700° F. to dry off most of the moisture contained in the shale. Preferably, the crushed oil shale particles are preheated to a temperature from 250° F. to 600° F., and most preferably, from 300° F. to 400° F. to enhance efficiency of retorting. Oil shale temperatures over 700° F. should be avoided at this stage, because they may cause premature retorting. The preheating station 16 and the crushing and screening station 12 can be combined if desired.

The preheated, crushed oil shale particles are conveyed from preheating station 16 through one or more preheated oil shale feed lines 18 and 20 by a screw conveyor or other conveying means, such as a lift elevator, gravity flow or conventional fluid conveying means, into an overflow fluid bed retort 22, which is sometimes referred to as a "fluidized bed" retort. The crushed raw oil shale particles are fed into retort 22 at a total solids flux flow rate between 500 and 10,000 lbs/ft$^2$ hr, and preferably between 1,000 and 3,000 lbs/ft$^2$ hr for best results.

Heat carrier material, preferably spent oil shale, is fed from heat carrier line 24 into retort 22 at a temperature from a 1000° F. to 1400° F., preferably from 1100° F. to 1300° F., and most preferably from 1150° F. to 1250° F. for enhanced thermal efficiency. In the preferred embodiment, the raw oil shale and spent oil shale are introduced into the top portion of the retort. Heat carrier material in excess of 1400° F. should not be fed into the retort because it will decompose substantial quantities of carbonates in the oil shale. Heat carrier material below a 1000° F. should not be fed into the retort, if possible, because fine removal problems are aggravated and heat carrier input requirements are increased because of the high attrition rates at high recycle ratios.

The ratio of the solids flux flow rate of the heat carrier material (spent shale) being introduced into the retort by heat carrier line 24 to the solids flux flow rate of raw oil shale in lbs/ft$^2$ hr, fed into the retort by feed lines 18 and 20 is in the range of from 2:1 to 10:1, and preferably from 3:1 to 5:1 for more efficient retorting.

In retort 22, the raw oil shale particles and spent shale are fluidized, entrained and mixed together so that the hot spent shale directly contacts and heats the raw oil shale particles to substantially retort the raw oil shale particles. The effluent product stream of hydrocarbons liberated during retorting is emitted in the retort as a gas, vapor, mist or liquid droplets and most likely, a mixture thereof.

An inert fluidizing lift gas, such as steam or recycled light hydrocarbon gases which have been liberated from the oil shale during retorting and separated into a steam or light gas fraction in a separator 26 such as a "fractionator," also referred to as a "distillation column" or "fractionating column" is injected by a lift gas ejector 28 into the bottom of retort 22 into a laterally moving fluid bed at a temperature between ambient temperature and 1000° F., preferably from 500° F. to 700° F., at a pressure from 1 psig to 50 psig, preferably 2 psig to 25 psig, and at a superficial gas velocity of 0.1 ft/sec to 10 ft/sec and preferably from 1 ft/sec to 5 ft/sec per second for better effectiveness. Depending on the size of the retort, other lift gas velocities can also be used.

Excessive lift gas velocities should be avoided because they have a tendency to break apart the oil shale particles. The lift gas velocity, however, must be great enough to provide enough lift to fluidize the majority of the oil shale and spent shale particles.

A molecular oxygen, combustion-supporting gas, such as air, should be avoided as a lift gas in retort 22 because it could undesirably combust the liberated effluent product stream of hydrocarbons. Combustion of the raw oil shale particles and the liberated hydrocarbons is prevented in retort 22 by preventing an amount of molecular oxygen sufficient to support combustion from entering the retort.

Raw or dedusted combustion off gases from combustor lift pipe 32 and combustion vessel 34 can also be used as the lift gas.

The solids residence time, lift gas velocity and pressure are correlated to allow retorting of substantially all the oil shale particles in retort 22 without substantial thermal cracking of the liberated hydrocarbons and substantially without carbonate decomposition.

The retorting temperature in retort 22 is in the range from 800° F. to 1200° F., preferably from 975° F. to 1050° F., and most preferably at 1025° F. for best results. Retorting temperatures above 1200° F. causes excessive carbonate decomposition. Retorting temperatures less than 1050° F. minimizes thermal cracking of the liberated hydrocarbons. The retorting pressure in retort 22 can be from atmospheric pressure to 20 psig or higher. The gas residence time and solids residence time in retort 22 are a function of the size and capacity of the retort, as well as the retorting temperature, pressure and flow rate of the fluidizing gas.

The effluent product stream of liberated hydrocarbons admixed with lift gas is withdrawn from the upper portion of retort 22 through product line 36 and partially dedusted in a cyclone 38. The dedusted hydrocarbons are discharged through overhead cyclone line 39 and separated into fractions of light gases, steam, light shale oil, middle shale oil and heavy shale oil in fractionating column 26. The light gases, steam, light shale oil, middle shale oil and heavy shale oil are withdrawn from fractionating column 26 through light gas line 40, steam line 42, light shale oil line 44, middle shale oil line 46 and heavy shale oil line 48, respectively. Heavy shale oil has a boiling point over 600° F. to 800° F. Middle shale oil has a boiling point over 400° F. to 500° F. and light shale oil has a boiling point over 100° F. The effluent oil and gases from fractionating column 26 can be dedusted further in downstream dedusting equipment and upgraded in a catalytic cracker or hydrotreater or otherwise processed downstream.

In retort 22, most of the raw and spent oil shale particles are fluidized with the lift gas and move laterally or radially outwardly in a laterally moving fluid bed until they overflow or spill over into a plurality of overflow discharge outlets 50 which extend downwardly from the upright peripheral wall 51 of the retort. Some heavier, larger oil shale particles or sediment might not be fluidized and gravitate to the bottom of the laterally moving fluid bed. These large particles are withdrawn through one or more solids discharge outlets 52 at the bottom of retort 22. All the raw oil shale particles are substantially retorted before discharged. The discharged particles gravitate from outlets 50 and 52, through discharge lines 54 and 56 respectively, into the bottom of an upright, dilute phase combustor lift pipe 32.

Air is injected into the bottom of combustor lift pipe 32 through air injector inlet 60 at a pressure and flow rate to fluidize, entrain, combust, propel, convey and transfer the retorted and spent oil shale particles upwardly through the lift pipe into an overhead combustor vessel or collection and separation bin 34. The combustion temperature in lift pipe 32 and overhead vessel 34 is from 1000° F. to 1400° F. Residual carbon contained on the retorted oil shale particles is substantially combusted in lift pipe 32 leaving spent shale for use as heat carrier material. The spent shale is discharged through an outlet in the bottom of overhead vessel 34 into heat carrier line 24 where it is conveyed by gravity flow into the top of retort 22.

The carbon contained in the retorted oil shale particles is burnt off mainly as carbon dioxide during combustion in lift pipe 32 and vessel 34 and together with the air and other products of combustion form combustion off gases or flue gases which are withdrawn from the upper portion of vessel 34 through combustion gas line 62 and dedusted in a cyclone 64 or an electrostatic precipitator before being discharged through overhead line 66 into the atmosphere or processed further to recover additional steam for use as the lift gas in retort 22.

Referring now to FIG. 2, a generally planar or flat, perforated distributor plate 68 extends laterally and horizontally across the retort to provide a stationary foraminous floor. An upright, conical baffle or deflector 72 with a cylindrical or polygonal base 74 and a conical head or cap 76 with an apex extends upwardly above the center of floor 68 along the vertical axis of the retort. Baffle 72 is stationary and permanently affixed to the floor of the retort. Conical cap 76 is located generally below feed lines 18, 20 and 24. In the preferred embodiment spent shale particles from line 24 are poured, sprinkled or fed into streams of raw oil shale particles from feed lines 18 and 20 to partially mix, integrate and commingle the particles before the particles flow downwardly and contact conical cap 76. Conical cap 76 enhances mixing of the particles and deflects the particles laterally, outwardly and downwardly into a laterally moving fluid bed 78.

Fluidizing lift gas is injected from gas line 28 into a plenum chamber or fluidizing chamber 80 located in the space between the foraminous floor 68 and the bottom 81 of the retort and passes upwardly through holes, openings or fluid flow passageways 82 in foraminous floor 68 into bed 78 to fluidize a substantial amount of the particles in the bed so that the particles move and behave as if they were in a fluid stream. The fluidizing lift gas strips, transports and propels the liberated hydrocarbons upwardly and away from the particles above the fluid bed into an overhead outlet 36.

As more oil shale particles enter the retort, fluid bed 78 gets higher. When the height of the fluid bed reaches the lower lip of overflow outlets 50, excess particles will overflow and spill laterally outwardly into overflow outlet 50. Retorting commences as the raw oil shale particles contact the spent shale particles and is substantially completed in the fluid bed before the particles are discharged in the overflow outlets.

The retort of FIG. 2 has a generally cylindrical shape with a diameter substantially greater than its overall height so that the laterally moving fluid bed 78 is relatively long and shallow. The height of the expanded fluidized bed 78 to the radius of the retort is from 0.06 to 0.6 and preferably from 0.1 to 0.4. The solids residence time in the retort is from 0.5 min. to 10 min. and preferably from 1 min. to 4 min.

Fluid bed retorting with lateral flow as shown in FIG. 2 has many advantages. Because the primary flow direction of the raw and spent shale particles through the bed is lateral, the intrinsic low mixing of solids in the lateral direction approaches plug flow with an increase in conversion of raw oil shale particles to liberated hydrocarbons for most residence times over conventional fluid bed retorts, which typically attempt to attain plug flow in the vertical direction. Thermal cracking and product degradation are minimized because hydrocarbons are stripped from the raw oil shale particles by the upwardly moving lift gas in a direction generally transverse to the laterally moving fluid bed. Because the fluidizing gas need only fluidize and suspend the oil shale particles in the fluid bed and need not lift the particles through the entire height of the retort, the fluidizing gas velocity of this process can be substantially lower than in conventional fluid bed retorts, which results in lower retorting pressures and substantial economic savings.

The ratio of bed height to bed diameter of the retort of FIG. 2 is relatively low to permit smaller bed volumes and minimize fluid bed pressure drop, bubble growth and entrainment. Furthermore, multiplicity of pneumatic in-bed solids injection systems is not required for the retort of FIG. 2 nor does the raw oil shale have to be ground to the size of fluid catalytic cracking catalysts in order to achieve adequate solids mixing at relatively short residence times.

The retort of FIG. 3 is similar to the retort of FIG. 2, except that in lieu of the conical baffle 72 in FIG. 2 the retort of FIG. 3 has a central premixing fluidized zone or chamber 84 peripherally surrounded by a tubular, imperforate containment wall 86 in which the incoming raw and spent oil shale particles are partially mixed and fluidized. In the illustrative embodiment, wall 86 extends laterally outwardly and below the outlet of feed lines 18, 20 and 24, and extends upwardly from the foraminous floor 68 to a position above the top surface of the fluid bed 78. In the illustrated embodiment, the height of wall 86 to the radius of the retort is from 0.1 to 0.3.

In the process of FIG. 3, the velocity of the lift gas in the premixing zone 84 is substantially greater than the lift gas in the laterally moving fluid bed 78 in order to mix, entrain, propel and transport the particles upwardly to spill over the upper edge or lip of wall 86. The velocity of the lift gas in premixing zone 84 should be greater than the terminal velocity of the particles for maximum mixing. Greater velocities in the premixing fluidizing chamber 86 can be attained by using larger apertures in the floor portion of the premixing fluidizing chamber than in the floor portion of the laterally moving fluidized bed or through the use of a second lift gas line in a separate plenum chamber of other means well known in the art.

In the premixing chamber 84, the raw and spent oil shale particles are rapidly mixed in a vertical moving fluid bed. As more incoming particles enter the premixing chamber the vertical moving bed will rise until the excess particles overflow and spill laterally outwardly over the upper edge or lip of the wall 86 into the laterally moving fluid bed 78.

Figure 5:
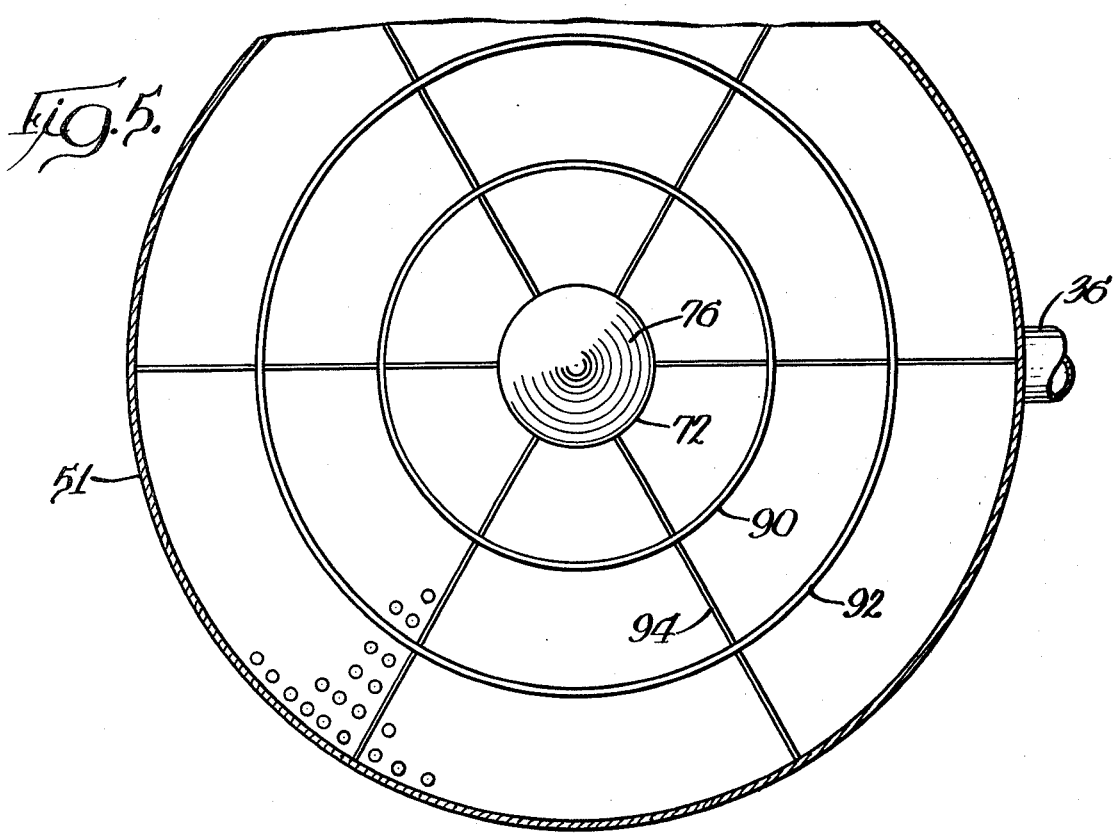
FIG. 5 is a fragmentary cross-sectional view taken substantially along line 5—5 of FIG. 4.

The retort shown in FIGS. 4 and 5 are substantially similar to the retort shown in FIG. 2, except that the retort shown in FIGS. 4 and 5 has one or more upright, concentric, imperforate annular baffles or weirs 90 and 92 which separate the retort into a series of consecutive fluid bed chambers. Annular baffles 90 and 92 extend upwardly from a position spaced above the foraminous floor 68 to a position below the top surface of the laterally moving fluid bed 78. Annular baffles 90 and 92 are fixedly secured to the base 74 of deflector 72 and to the outer walls of the retort as well as to each other by a criss-cross arrangement of spaced struts 94 or other means well known in the art.

The operation of the retort shown in FIG. 4 is similar to the operation of the retort shown in FIG. 2, except that the lateral moving fluidized bed 78 of raw and spent oil shale particles move laterally against as well as over and under annular baffles 90 and 92 as the particles move outwardly towards the overflow outlets 50. The annular baffles in the process of FIG. 4 enhance lateral plug flow of the particles. The annular baffles in the process also increase the conversion of raw oil shale to liberated hydrocarbons and decrease the volume of bed solids with minimal product degradation, without substantially interfering with the upward stripping of liberated hydrocarbons. The arrangement of annular baffles shown in FIG. 4 can also be used in the retort shown in FIG. 3.

Figure 6:
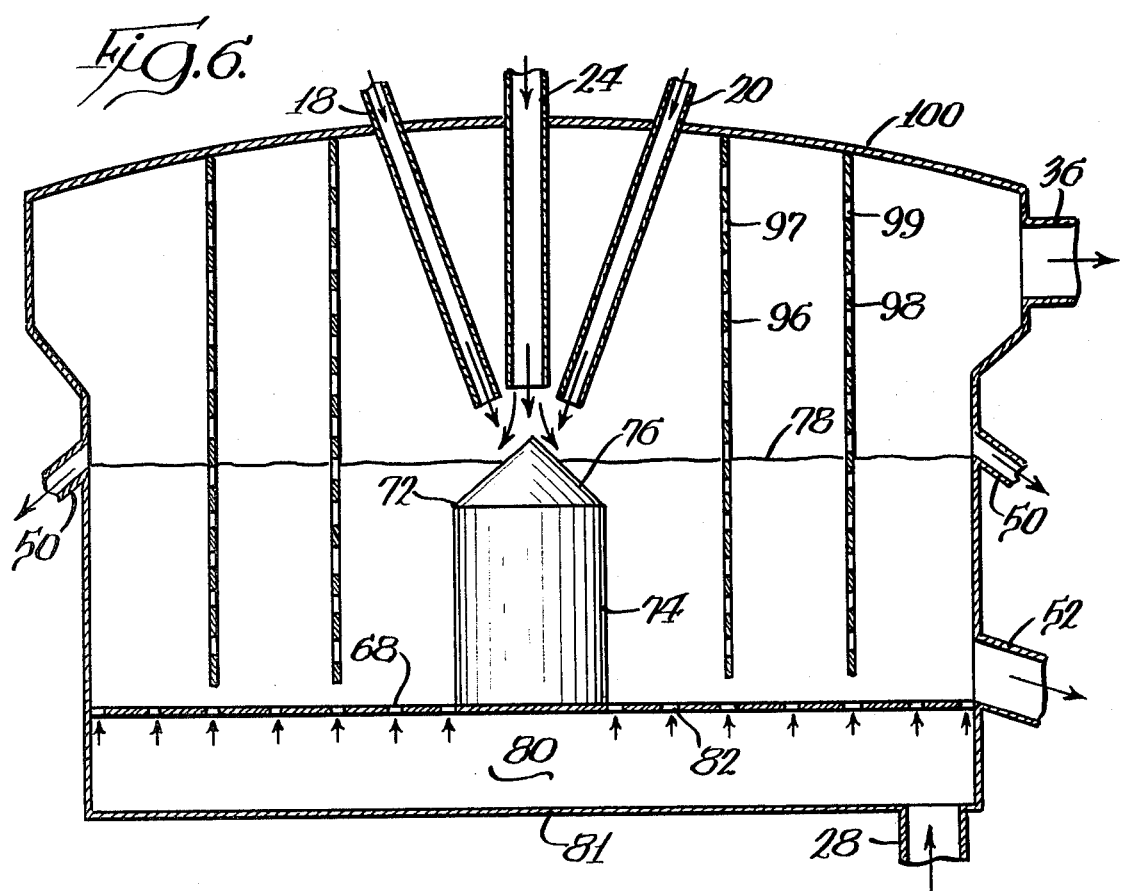
FIG. 6 is a cross-sectional view of a retort with upwardly extending annular baffles for use in the process.

The retort shown in FIG. 6 is substantially similar to the retort shown in FIG. 4, except that the upright, concenric annular baffles or weirs 96 and 98 in the retort of FIG. 6 extend above the top surface of the laterally moving fluid bed 78 to minimize wave propagation and backmixing. In the illustrated embodiment, annular baffles or weirs 96 and 98 extend vertically from the foraminous floor 68 to the retort's ceiling 100 to which they are welded or otherwise fixedly secured.

In the embodiment of FIG. 6, baffles 96 and 98 are foraminous with apertures, holes or fluid flow passageways 97 and 99, respectively. The apertures 97 and 99 in the baffles 96 and 98 above the surface of the fluid bed 78 permit passage of liberated hydrocarbons and fluidizing gas to outlet 36. The apertures 97 and 99 in the baffles 96 and 98 below the top surface of the fluid bed 78 permits passage of the particles to overflow outlet 50. In some circumstances, it may also be desirable that the submerged portions of the annular baffles 96 and 98, below the top surface of bed 78, be imperforate to prevent passage of particles therethrough or that the baffles not extend entirely to the ceiling. The annular baffle arrangement of FIG. 6 can also be used in the retort of FIG. 3.

Referring now to FIGS. 7 and 8, the trough-like, generally channel-shaped retort shown therein has a premixing fluidizing chamber or zone 102 followed by a series of consecutive fluid bed chambers or zones 104, 106 and 108 which contain a laterally moving fluid bed 109. Premixing fluidizing chamber 102 is separated from chamber 104 by an upright transverse wall 110 which extends vertically upwardly from the foraminous floor 116. Chambers 104, 106 and 108 are separated from each other by upright, imperforate transverse baffles or weirs 112 and 114, respectively, which are spaced above foraminous floor 116 and extend vertically to above the top surface of the fluid bed 109. The upwardly extending transverse baffles 112 and 114 substantially prevent the oil shale particles from flowing over the baffles and minimize wave propagation and backmixing. Baffles which allow both underflow and overflow of solids, i.e., baffles which are spaced below the surface of the laterally moving bed, can also be used.

As best shown in FIG. 8, transverse wall 110 and transverse baffles 112 and 114 extend transversely across the entire width of the retort and are welded or otherwise secured to the retort's laterally extending sidewalls 118 and 120. In the embodiment of FIG. 8, transverse wall 110 and transverse baffles 112 and 114 are generally planar or flat and are parallel to the retort's end walls 122 and 124. Baffles 112 and 114 are imperforate and fluid impervious. If desired, the baffles can be perforated and extend to the ceiling of the retort in a manner similar to the baffles of FIG. 6.

In premixing chamber 102 (FIG. 7), the incoming raw and spent oil shale particles are poured into each other and are rapidly fluidized, entrained and mixed in a turbulent manner with an upwardly flowing, fluidizing lift gas. The lift gas enters the premixing chamber 102 from the plenum chamber 126 through apertures 128 in foraminous floor 116. The fluidized particles in premixing chamber 102 spill over the upper end of wall 110 into a laterally moving fluid bed 109 in chamber 104.

In fluid bed 109, the oil shale particles move laterally against and sequential under transverse baffles 112 and 114 as they flow laterally outwardly (left to right in FIG. 7) in reponse to the spilling and overlow of particles into overflow discharge outlet 50. As more oil shale particles enter premixing chamber 102, fluid bed 109 gets higher until the fluid bed 109 reaches the lower lip of overflow discharge outlet 50, and the excess fluidized particles overflow and spill laterally outwardly into overflow outlet 50.

The lift gas velocity in the laterally moving bed 109 should be sufficient to fluidize most particles in the bed but can be substantially less than in the premixing chamber 102 where all the particles are entrained. The lift gas is injected in the laterally moving bed 109 through the aperture 128 in the foraminous floor 116 directly below the bed 109. The lift gas velocity can be controlled in a manner similar to that of FIG. 3.

In the retort of FIG. 7, the foraminous floor 116 is sloped downwardly from one degree to 30 degrees in the direction of lateral flow to enhance gravity flow of any unfluidized large, coarse particles or sediment into discharge outlet 52.

Floor 116 (FIG. 7) can also have upwardly extending jet deflectors 130 positioned slightly upstream of the floor's apertures 128. Jet deflectors 130 are curved, hook-shaped or ramp-shaped to partially deflect the flow of fluidizing gas in the direction of lateral flow to enhance lateral outward flow of any unfluidized large particles into discharge outlet 52. The jet deflectors and/or sloping floor arrangement can also be used in the previously described retorts to enhance lateral discharge of any unfluidized large particles.

The sloping floor cooperates with wall 110 and the upright transverse baffles or weirs 112 and 114 to provide a stepwise, staged fluid bed 109 in which the height of the fluid bed is progressively lowered in chambers 104, 106 and 108, respectively, in the direction of lateral flow.

The retorting process of FIGS. 7 and 8 provides advantages which are similar to many of the advantages described in the retorting processes of FIGS. 2-6, as well as provides additional advantages.

It can be appreciated that in all of the above embodiments, the portion of the upright end wall that extends vertically from the foraminous floor and bottom of the bed to the lower lip of the overflow discharge outlet(s) provides an upright fluid flow barier over which the fluidized particles spill laterally outwardly into the overflow discharge outlet. Furthermore, the foraminous floor in all of the above embodiments can be in the form of a perforated distributor plate, slotted tray, jet tray or bubble tray with optional bubble caps.

While raw and spent oil shale particles are preferably premixed in the retort before entering the laterally moving fluid bed, such as with a conical baffle and/or by sprinkling or fluidizing, in some circumstances it may be desirable that the raw and spent oil shale particles commence mixing upon entering the laterally moving fluid bed, without the use of a conical baffle, premixing fluidizing chamber, or sprinkling. Baffles having other shapes can also be used.

Although embodiments of this invention have been shown and described, it is to be understood that various modifications and substitutions, as well as rearrangements of parts and combinations of process steps, can be made by those skilled in the art without departing from the novel spirit and scope of the invention.

What is claimed is:

1. A process for retorting oil shale, comprising the steps of:
   (a) feeding at least one stream of raw oil shale particles generally downward into an overflow fluid bed retort against a generally conical portion of a baffle located substantially along a vertical axis of said retort;
   (b) feeding a stream of spent oil shale particles at a temperature greater than the minimum retorting temperature of said raw oil shale particles generally downwardly against said conical portion of said baffle, concurrently with step (a);
   (c) deflecting said streams generally downwardly and laterally outwardly off said conical portion and radially away from said vertical axis into a laterally moving bed to enhance mixing of said streams;
   (d) liberating hydrocarbons from said raw oil shale particles in said bed;
   (e) injecting a fluidizing gas into said bed while preventing combustion in said retort to fluidize a substantial amount of particles in said bed and strip and transport said liberated hydrocarbons upwardly and away from said bed;
   (f) spilling said fluidized particles in said bed over a generally upright barrier extending substantially above the bottom of said bed into at least one overflow discharge outlet;
   (g) laterally and radially moving said fluidized particles in said bed in a generally radial flow pattern from said vertical axis and said conical portion of said baffle to said overflow discharge outlet in response to said spilling;
   (h) conveying said particles from said discharge outlet to a combustor lift pipe; and
   (i) fluidizing, combusting and transporting said particles generally upwardly through said combustor lift pipe with an oxygen-containing combustion-sustaining gas to provide spent oil shale particles for step (b).

2. A process in accordance with claim 1 wherein said streams are combined generally about the vertical axis of said retort before contacting said conical portion of said baffle.

3. A process in accordance with claim 1 wherein:
   said raw oil shale particles are preheated to a temperature slightly below the retorting temperature of said raw oil shale particles before being fed into said retort;
   said fluidizing gas is selected from the group consisting of steam, light hydrocarbon gases separated from said liberated hydrocarbons and off gases emitted from said combustion;
   said oxygen-containing gas is air;
   said barrier extends generally vertically above a foraminous floor at the bottom of said bed;
   said fluidizing gas flows generally upwardly through said foraminous floor into said bed; and
   said bed moves generally crosswise to the upward flow of said fluidizing gas.

4. A process for retorting oil shale, comprising the steps of:
   (a) feeding at least one stream of raw oil shale particles generally downwardly into an overflow fluid bed retort about the vertical axis of said retort into a central fluidized premixing zone laterally surrounded by a generally imperforate, tubular containment wall extending generally upwardly from a foraminous floor within the interior of said retort;
   (b) feeding a stream of spent oil shale particles into said central fluidized premixing zone at a temperature greater than the minimum retorting temperature of said raw oil shale particles, concurrently with step (a);
   (c) fluidizing, entraining, partially mixing and transporting said particles in said central premixing zone generally upwardly over the top of said tubular containment wall within a fluidizing gas;
   (d) gravitating said entrained particles generally downwardly into a laterally moving bed lying generally upon and above said foraminous floor;
   (e) said spent particles contacting said raw oil shale particles to liberate hydrocarbons from said raw oil shale particles;
   (f) injecting said fluidizing gas generally upwardly into said laterally moving fluid bed through fluid flow passageways in said foraminous floor while preventing combustion in said retort to maintain fluidization of a substantial portion of said particles in said fluid bed and to strip and transport said liberated hydrocarbons upwardly and away from said particles into an outlet above said laterally moving fluid bed;
   (g) spilling said particles in said fluid bed outwardly over a generally upright fluid flow barrier extending above said foraminous floor into at least one overflow discharge outlet;
   (h) moving said particles in said fluid bed laterally outwardly and radially away from said premixing zone to said overflow discharge outlet in response to said spilling;
   (i) conveying said particles from said discharge outlet to a combustor lift pipe; and
   (j) fluidizing, combusting and transporting said particles generally upwardly through said combustor lift pipe with an oxygen-containing, combustion-sustaining gas to provide spent oil shale particles for step (b).

5. A process in accordance with claim 4 wherein:
   said raw oil shale particles are preheated to a temperature slightly below the retorting temperature of said raw oil shale particles before being fed into said retort;
   said fluidizing gas is selected from the group consisting of steam, light hydrocarbon gases separated from said liberated hydrocarbons and off gases emitted from said combustion; and
   the velocity of said fluidizing gas in step (c) is substantially greater than the velocity of said fluidizing gas in step (f).

6. A process for retorting oil shale, comprising the steps of:

(a) feeding at least one stream of raw oil shale particles into a premixing fluidizing chamber in a retort;

(b) feeding a stream of spent oil shale particles at a temperature greater than the minimum retorting temperature of said oil shale, into said premixing fluidizing chamber, concurrently with step (a);

(c) fluidizing, entraining and mixing said particles in said premixing fluidizing chamber with a fluidizing gas;

(d) spilling said particles over a wall into a laterally moving fluid bed;

(e) moving said particles laterally outwardly and away from said premixing chamber through a series of consecutive fluid bed chambers separated from each other by generally upright transverse baffles spaced laterally along and above a foraminous floor in said retort while concurrently moving said bed laterally against and under said upright baffles;

(f) said spent particles contacting said raw oil shale particles for a sufficient time to liberate hydrocarbons from said raw oil shale particles;

(g) injecting said fluidizing gas generally upwardly through apertures in said foraminous floor into said bed while preventing combustion in said retort to maintain fluidization of a substantial number of said particles in said bed and to strip and transport said liberated hydrocarbons upwardly and away from said particles into an outlet above said bed;

(h) spilling said particles in said bed outwardly over a generally upright barrier extending substantially above said floor in said retort into an overflow discharge outlet after passing through said consecutive chambers, said particles moving laterally in step (d) in response to said spilling;

(i) conveying said particles from said discharge outlet to a combustor lift pipe; and (j) fluidizing, combusting and transporting said particles generally upwardly through said lift pipe with an oxygen-containing combustion-sustaining gas to provide spent oil shale particles for step (b).

7. A process in accordance with claim 6 wherein said particles are moved in a stepwise, staged fluid bed in said fluid bed chambers.

8. A process in accordance with claim 6 wherein said fluidizing gas is selected from the group consisting of steam, light hydrocarbon gases separated from said liberated hydrocarbons and off gases emitted from said combustion.

9. A process in accordance with claim 6 wherein said foraminous floor is inclined downwardly in the direction of flow and at least some larger particles move downwardly by gravity flow at an angle of inclination along said inclined floor of said retort into a discharge outlet.

10. A process in accordance with claim 9 wherein said fluidizing gas is deflected by jet deflectors against said larger particles to help move said larger particles into said discharge outlet.

11. A process for retorting oil shale, comprising the steps of:

(a) feeding at least one stream of raw oil shale particles generally downwardly against a generally conical portion of a baffle in a retort;

(b) feeding a stream of spent oil shale particles at a temperature greater than the minimum retorting temperature of said raw oil shale particles generally downwardly against said conical portion of said baffle, concurrently with step (a);

(c) deflecting said streams generally downwardly and laterally outwardly off said conical portion into a laterally moving bed;

(d) liberating hydrocarbons from said raw oil shale particles in said bed;

(e) injecting a fluidizing gas into said bed while preventing combustion in said retort to fluidize a substantial amount of particles in said bed and strip and transport said liberated hydrocarbons upwardly and away from said bed;

(f) spilling said fluidized particles in said bed over a generally upright barrier extending substantially above the bottom of said bed into at least one overflow discharge outlet;

(g) laterally moving said fluidized particles in said bed from said conical portion to said overflow discharge outlet in resonse to said spilling;

(h) conveying said particles from said discharge outlet to a combustor lift pipe;

(i) fluidizing, combusting and transporting said particles generally upwardly through said combustor lift pipe with an oxygen containing combustion-sustaining gas to provide spent oil shale particles for step (b); and (j) moving said bed laterally against and below at least one generally upright annular baffle in said retort.

12. A process in accordance with claim 11 including moving a portion of said bed through fluid flow passageways in said annular baffle.

13. A process in accordance with claim 11 including moving a portion of said bed over said annular baffle.

14. A process in accordance with claim 11 whrein said annular baffle extends substantially upwardly above said bed to define a barrier for blocking said bed from flowing over said annular baffle to substantially minimize backmixing and wave propagation.

15. A process for retorting oil shale, comprising the steps of:

(a) feeding at least one stream of raw oil shale particles generally downwardly into a fluidized premixing zone laterally surrounded by a generally imperforate, tubular containment wall within the interior of a retort;

(b) feeding a stream of spent oil shale particles into said premixing fluidized zone at a temperature greater than the minimum retorting temperature of said raw oil shale particles, concurrently with step (a);

(c) fluidizing, entraining, and transporting said particles in said premixing zone generally upwardly over the top of said tubular containment wall with a fluidizing gas;

(d) gravitating said entrained particles generally downwardly into a laterally moving bed lying generally upon and above a foraminous floor;

(e) said spent particles contacting said raw oil shale particles to liberate hydrocarbons from said raw oil shale particles;

(f) injecting said fluidizing gas generally upwardly into said laterally moving fluid bed through fluid flow passageways in said foraminous floor while preventing combustion in said retort to maintain fluidization of a substantial portion of said particles in said fluid bed and to strip and transport said liberated hydrocarbons upwardly and away from said particles into an outlet above said laterally moving fluid bed;

(g) spilling said particles in said fluid bed outwardly over a generally upright fluid flow barrier extending above said foraminous floor into at least one overflow discharge outlet;

(h) moving said particles in said fluid bed laterally outwardly from said premixing zone to said overflow discharge outlet in response to said spilling;

(i) conveying said particles from said discharge outlet to a combustor lift pipe;

(j) fluidizing, combusting and transporting said particles generally upwardly through said combustor lift pipe with an oxygen-containing, combustion-sustaining gas to provide spent oil shale particles for step (b); and (k) moving said bed laterally against and below at least one generally upright annular baffle spaced above said floor.

16. A process in accordance with claim 15 including moving a portion of said bed through fluid flow passageways in said annular baffle.

17. A process in accordance with claim 15 including moving a portion of said bed over said annular baffle.

18. A process in accordance with claim 15 including substantially preventing said bed from flowing over said annular baffle.

19. A process for retorting solid hydrocarbon-containing material, comprising the steps of:

forming a single level laterally moving bed in an overflow fluid bed retort having only one level of perforated distributor plate means, said moving bed comprising solid hydrocarbon-containing material selected from the group consisting of oil shale, tar sands, coal, peat, lignite, uintaite and oil saturated diatomaceous earth and solid heat carrier material selected from the group consisting of spent hydrocarbon-containing material, sand, ceramic balls and metal balls;

fluidly moving said bed above said perforated distributor plate means in a lateral direction for a sufficient time and at a sufficient temperature and at substantially only one level in said overflow retort to liberate hydrocarbons from said solid hydrocarbon-containing material in said bed;

spilling said bed over a generally upright barrier extending above said perforated distributor plate means into an overflow discharge outlet extending laterally outwardly of said retort for passage of the bed directly out of said retort;

withdrawing said liberated hydrocarbons from said bed through a product outlet in said retort located above said bed; and fluidizing said solid hydrocarbon-containing material and said solid heat carrier material within a premixing zone laterally surrounded by a tubular containment wall extending above said perforated distributor plate means before entering said bed.

20. A process for retorting solid hydrocarbon-containing material, comprising the steps of:

forming a single level laterally moving bed in an overflow fluid bed retort having only one level of perforated distributor plate means, said moving bed comprising solid hydrocarbon-containing material selected from the group consisting of oil shale, tar sands, coal, peat, lignite, uintaite and oil saturated diatomaceous earth and solid heat carrier material selected from the group consisting of spent hydrocarbon-containing material, sand, ceramic balls and metal balls;

said solid hydrocarbon containing material and said solid heat carrier material being mixed and deflected generally downwardly and laterally outwardly into said bed by a conical baffle extending upwardly from said perforated distributor plate means;

fluidly moving said bed above said perforated distributor plate means in a lateral direction for a sufficient time and at a sufficient temperature and at substantially only one level in said overflow retort to liberate hydrocarbons from said solid hydrocarbon-containing material in said bed;

spilling said bed over a generally upright barrier extending above said perforated distributor plate means into an overflow discharge outlet extending laterally outwardly of said retort for passage of the bed directly out of said retort; and withdrawing said liberated hydrocarbons from said bed through a product outlet in said retort located above said bed.

21. A process for retorting solid hydrocarbon-containing material, comprising the steps of:

forming a single level laterally moving bed in an overflow fluid bed retort having only one level of perforated distributor plate means, said moving bed comprising solid hydrocarbon-containing material selected from the group consisting of oil shale, tar sands, coal, peat, lignite, uintaite and oil saturated diatomaceous earth and solid heat carrier material selected from the group consisting of spent hydrocarbon-containing material, sand, ceramic balls and metal balls;

said solid heat carrier material and said solid heat carrier material being poured onto each other and partially mixed before entering said bed;

fluidly moving said bed above said perforated distributor plate means in a lateral direction for a sufficient time and at a sufficient temperature and at substantially only one level in said overflow retort to liberate hydrocarbons from said solid hydrocarbon-containing material in said bed;

spilling said bed over a generally upright barrier extending above said perforated distributor plate means into an overflow discharge outlet extending laterally outwardly of said retort for passage of the bed directly out of said retort; and withdrawing said liberated hydrocarbons from said bed through a product outlet in said retort located above said bed.

22. A process for retorting solid hydrocarbon-containing material, comprising the steps of:

forming a single level laterally moving bed in an overflow fluid bed retort having only one level of perforated distributor plate means, said moving bed comprising solid hydrocarbon-containing material selected from the group consisting of oil shale, tar sands, coal, peat, lignite, uintaite and oil saturated diatomaceous earth and solid heat carrier material selected from the group consisting of spent hydrocarbon-containing material, san, ceramic balls, and metal balls;

fluidly moving said bed above said perforated distributor plate means in a lateral direction for a sufficient time and at a sufficient temperature and at substantially only one level in said overflow retort to liberate hydrocarbons from said solid hydrocarbon-containing material in said bed;

moving said bed laterally against and beneath at least one generally upright baffle in said retort;

spilling said bed over a generally upright barrier extending above said perforated distributor plate means into an overflow discharge outlet extending laterally outwardly of said retort for passage of the bed directly out of said retort; and withdrawing said liberated hydrocarbons from said bed through a product outlet in said retort located above said bed.

* * * * *

UNITED STATES PATENT OFFICE
CERTIFICATE OF CORRECTION

Patent No. 4,430,195           Dated February 7, 1984

Inventor(s) OLTROGGE, ROBERT DAVID

It is certified that error appears in the above-identified patent and that said Letters Patent are hereby corrected as shown below:

Patent

| Column | Line | | |
|---|---|---|---|
| 5 | 18 | "het" | should be --heat-- |
| 6 | 15 | "section" | should be --sectional-- |
| 13 | 18 | "downward" | should be --downwardly-- |
| 16 | 19 | "resonse" | should be --response-- |
| 16 | 35 | "whrein" | should be --wherein-- |
| 18 | 3 | "hydrocarbon containing" | should be --hydrocarbon-containing |
| 18 | 36 | "heat carrier" (first occurence) | should be --hydrocarbon-containing-- |
| 18 | 63 | "san" | should be --sand-- |

Signed and Sealed this

Third Day of July 1984

[SEAL]

Attest:

Attesting Officer

GERALD J. MOSSINGHOFF

Commissioner of Patents and Trademarks